(12) United States Patent
Gale et al.

(10) Patent No.: US 7,983,175 B2
(45) Date of Patent: Jul. 19, 2011

(54) SYSTEM AND METHOD FOR DETECTING A NETWORK FAILURE

(75) Inventors: Martin J. Gale, Southampton Hampshire (GB); Clare Owens, Southampton Hampshire (GB); Peter Johnson, Hants (GB); Jason Edmeades, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 12/233,724

(22) Filed: Sep. 19, 2008

(65) Prior Publication Data

US 2010/0074118 A1   Mar. 25, 2010

(51) Int. Cl.
H04L 12/28   (2006.01)
(52) U.S. Cl. ............................. 370/242; 370/248; 714/25
(58) Field of Classification Search ........................ None
See application file for complete search history.

(56) References Cited

U.S. PATENT DOCUMENTS

| | | | |
|---|---|---|---|
| 4,980,857 A * | 12/1990 | Walter et al. ..................... 714/45 |
| 5,051,996 A * | 9/1991 | Bergeson et al. ............. 714/732 |
| 6,494,831 B1 | 12/2002 | Koritzinsky |
| 6,894,980 B1 | 5/2005 | Pugaczewski et al. |
| 6,959,403 B2 | 10/2005 | Dierauer et al. |
| 7,284,147 B2 | 10/2007 | Rao et al. |
| 2003/0117961 A1 * | 6/2003 | Chuah et al. .................. 370/242 |
| 2003/0120984 A1 | 6/2003 | Chuah et al. |
| 2006/0107086 A1 | 5/2006 | Walker et al. |
| 2006/0203739 A1 | 9/2006 | Padmanabhan et al. |
| 2006/0268680 A1 | 11/2006 | Roberts et al. |
| 2007/0014232 A1 | 1/2007 | Yasuie et al. |

OTHER PUBLICATIONS

Quittek et al, IETF RFC 4560, "Definitions of Managed Objects for Remote Ping, Traceroute, and Lookup Operations", Jun. 2006, pp. 3-5.*

\* cited by examiner

*Primary Examiner* — Jianye Wu
(74) *Attorney, Agent, or Firm* — Gibb I.P. Law Firm, LLC; Robert E. Straight, II, Esq.

(57) ABSTRACT

A method and system detect a failed communication transmission that fails to reach a recipient after attempting to be transmitted from a sender to the recipient over a communication path. Upon detection of the failed communication, the method initiates a first inquiry process from the sender. This first inquiry process tests how far a first test communication transmission can travel from the sender to the recipient along the communication path. Similarly, upon detection of the failed communication, the method initiates a second inquiry process from the recipient. The second inquiry process tests how far a second test communication transmission can travel from the recipient to the sender along the communication path. The method combines the results of the first inquiry process and the results of the second inquiry process to determine which of the nodes in the communication path are not successfully forwarding test communications to identify at least one possibly faulty node. The identification of the possibly faulty node is then output to the sender and the recipient.

16 Claims, 3 Drawing Sheets

SYSTEM AND METHOD FOR DETECTING A NETWORK FAILURE

BACKGROUND

1. Field of the Invention

The embodiments of the invention generally relate to identifying failures within a communications network and more particularly to systems and methods that search for failures from both the sender side and the recipient side and that identify possible failed nodes before reporting the communications failure, so that both the failure and the possible source of the failure can be reported together.

2. Description of Related Art

Within networked applications the connection between two parties (e.g., a sender and a recipient) can fail for some reason unknown to either of the parties. In business critical applications, loss of connectivity often means the business ceases to function as it should with the resulting loss of revenue as a result.

Often at the application layer (for example a Java™ Application, Java and all Java-based trademarks and logos are trademarks of Sun Microsystems, Inc., in the United States, other countries, or both) the failure manifests itself as a very simplistic exception (e.g. an IOException in Java™) which effectively tells the application nothing more than "something has broken". This can (and does) lead in extreme cases to each party blaming the other for the loss of connection, particularly if a service level agreement (SLA) of some kind is in place between the two.

Similarly, problem determination can be hard to focus, particularly if the connection is formed by a route over a number of hops, for example a LAN in a data centre, a public WAN such as the Internet, and so on. The embodiments described below help narrow the failure possibilities to help better identify the broken point in the connection.

SUMMARY

In order to address these issues, one method embodiment (which can be controlled and/or operated by a third party) herein detects a failed communication transmission that fails to reach a recipient after attempting to be transmitted from a sender to the recipient over a communication path. The communication path is formed of a plurality of nodes of at least one computerized network.

Upon detection of the failed communication, the method initiates a first inquiry process from the sender. This first inquiry process tests how far a first test communication transmission can travel from the sender to the recipient along the communication path. Similarly, upon detection of the failed communication, the method initiates a second inquiry process from the recipient. The second inquiry process tests how far a second test communication transmission can travel from the recipient to the sender along the communication path. Thus, the first inquiry process and the second inquiry process send (potentially simultaneously) the test messages from opposite ends of the communication path.

In order to initiate such testing (the first inquiry process and the second inquiry process) the method sends instructions to the sender and the recipient over a second communication path that is different than the first communication path.

The method combines the results of the first inquiry process and the results of the second inquiry process to determine which of the nodes in the communication path are not successfully forwarding test communications to identify at least one possibly faulty node. The identification of the possibly faulty node is then output to the third party, the sender and/or the recipient.

This process of using the results of the first and second inquiry processes involves identifying at least one of the nodes positioned between a first farthest limit and a second farthest limit. The first farthest limit is the farthest location along the communication path from the sender where a first test communication transmission traveled. The second farthest limit is the farthest location along the communication path from the recipient where a second test communication transmission traveled as the possibly faulty node.

In some embodiments the results of the first and second inquiry processes can be sent to a third party that is different than the sender and the recipient. This third party would then perform the process of using the results to identify the possibly faulty node.

Simultaneous with the outputting of the identification of the possibly faulty node, the method can also output an identification of the failed communication transmission to the sender and the recipient. Therefore, the embodiments herein do not just report that a communication transmission has failed, but also simultaneously report the possibly faulty node or nodes that are likely responsible.

In addition, system embodiments are presented herein. One system embodiment comprises a monitor that can be positioned in the sender or the recipient (or positioned external to both) and that is operatively connected to the communication path.

The monitor detects the failed communication transmission that fails to reach a recipient after attempting to be transmitted from a sender to the recipient over the communication path. Also, the monitor sends instructions to the first tester and the second tester over a second communication path (that is different than the first communication path) to initiate the first inquiry process and the second inquiry process. Again, the first inquiry process and the second inquiry process send test messages (test communication transmissions) from opposite ends of the communication path.

In addition, the system includes a first tester that is operatively connected to the monitor and is in communication with or positioned within the sender. The first tester initiates the first inquiry process from the sender upon the detection of the failed communication. Again, the first inquiry process tests how far the first test communication transmission can travel from the sender along the communication path.

Similarly, the system includes a second tester that is operatively connected to the monitor and is in communication with or positioned within the recipient. The second tester initiates the second inquiry process from the recipient upon the detection of the failed communication. Again, the second inquiry process tests how far the second test communication transmission can travel from the recipient along the communication path.

The system further includes a processor that is operatively connected to the first tester and the second tester. The processor can be within the first tester, the second tester or can be a third party separate from both. The first and second testers respectively output the results of the first and second inquiry processes to the processor.

Then, the processor combines the results of the first and second inquiry processes to determine which of the nodes in the communication path are not successfully forwarding test communications so as to identify the one or more possibly faulty nodes. The processor combines the results by identifying the node or nodes positioned between the first farthest limit along the communication path from the sender where the first test communication transmission traveled and the second farthest limit along the communication path from the recipient where the second test communication transmission traveled as the possibly faulty node.

The processor outputs the identification of the possibly faulty node (potentially from the third party) to the sender and the recipient. In some embodiments the processor can output, simultaneous with the outputting of the identification of the possibly faulty node, an identification of the failed communication transmission to the sender and the recipient.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
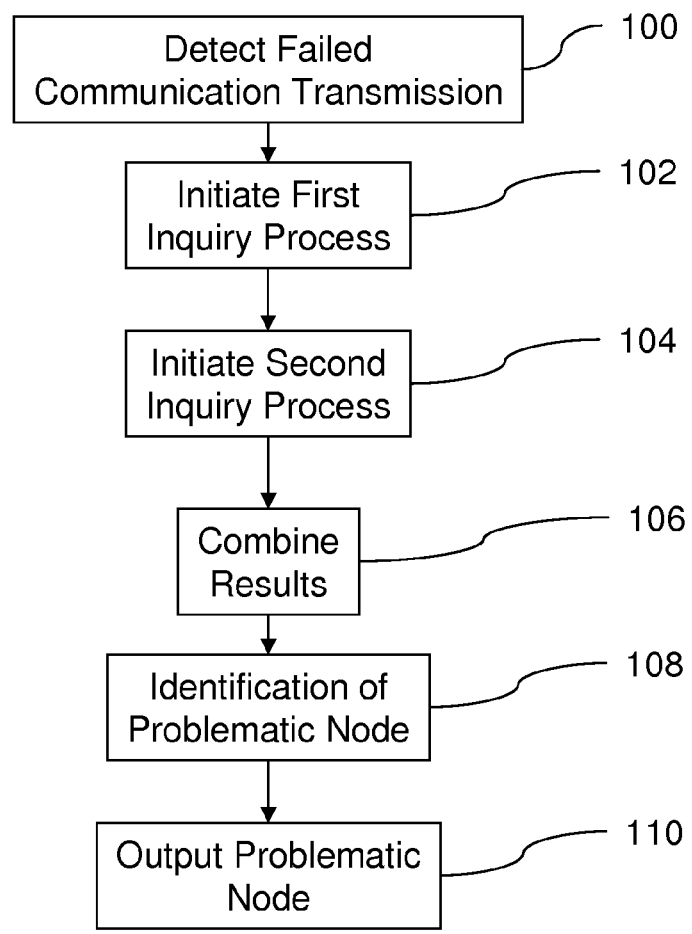
FIG. 1 is a flow diagram illustrating a method embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, conventional systems can report communication failures, without identifying the cause. To address such issues, embodiments herein search for failures from both the sender side and the recipient side. Further, embodiments herein identify possible failed nodes before reporting the communications failure so that both the failure and the possible source of the failure can be reported together.

Thus, on discovery of a network breakage, instead of raising an exception immediately to the application, the embodiments herein (e.g., using a Socket on Java™) issue a diagnostic call (e.g. to Ping®, Traceroute®, Pathchar®, and Tulip® or similar applications, discussed below) to determine how far down the given route between the two points a party is able to connect. Traceroute®, for example, is able to show the route between two points and establish connections with each hop, returning a code to indicate success (or otherwise, with a reason) upon reaching that hop.

As shown in flowchart form in FIG. 1, one embodiment herein begins by detecting a failed communication transmission in item 100. All the steps herein can be controlled, operated, and/or performed by a third party that is separate from the sender and the recipient. For example, the third party can own and/or control software used by the sender and recipient to perform the process described below such that, in effect, the third party is performing all the steps of the method described below. More specifically, a failed communication transmission can occur when a recipient does not receive an expected or requested item after a specific time period has timed-out, or when a sender does not receive a confirmation that a sent item has been received by the recipient after a specific time period has timed-out.

Upon detection of the failed communication, the method initiates a first inquiry process from the sender in item 102. This first inquiry process 102 tests how far a first test communication transmission can travel from the sender to the recipient along the communication path. Similarly, upon detection of the failed communication, the method initiates a second inquiry process from the recipient in item 104. The second inquiry process 104 tests how far a second test communication transmission can travel from the recipient to the sender along the communication path. Thus, the first inquiry process 102 and the second inquiry process 104 send (potentially simultaneously) the test messages from opposite ends of the communication path.

The method combines the results of the first inquiry process 102 and the results of the second inquiry process 104 in item 106 to determine which of the nodes in the communication path are not successfully forwarding test communications to identify at least one possibly faulty node, shown as item 108. The identification of the possibly faulty node is then output to the sender and the recipient in item 110.

Simultaneous with the outputting of the identification of the possibly faulty node in item 110, the method can also output an identification of the failed communication transmission to the sender 200 and the recipient 202. Therefore, the embodiments herein do not just report that a communication transmission has failed, but also simultaneously report the possibly faulty node or nodes that are likely responsible.

Figure 2:
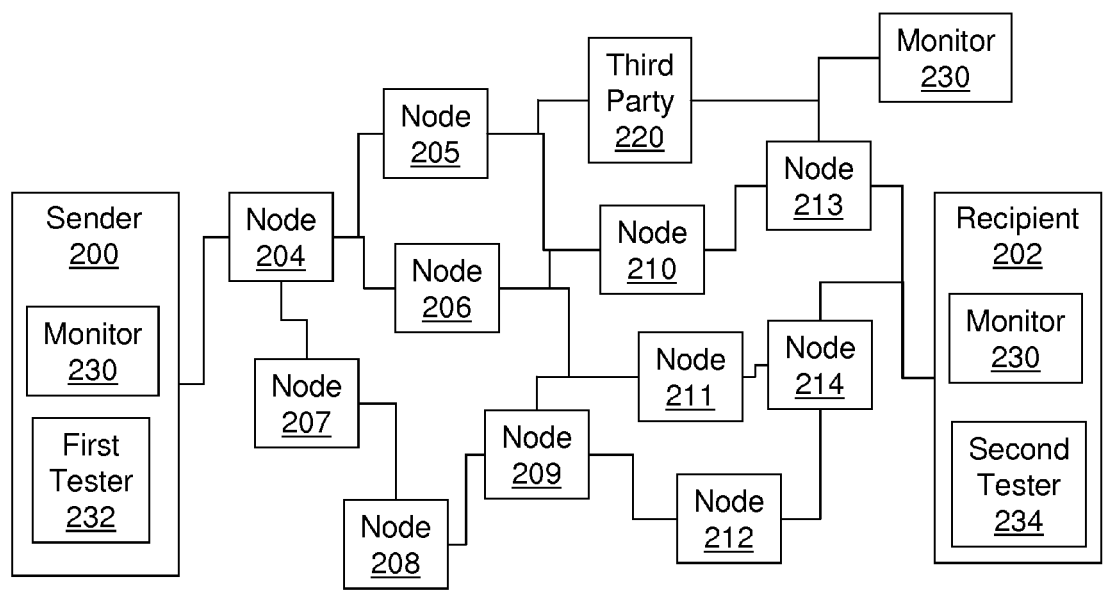
FIG. 2 is a schematic diagram of a communication network embodiment of the invention.
Figure 3:
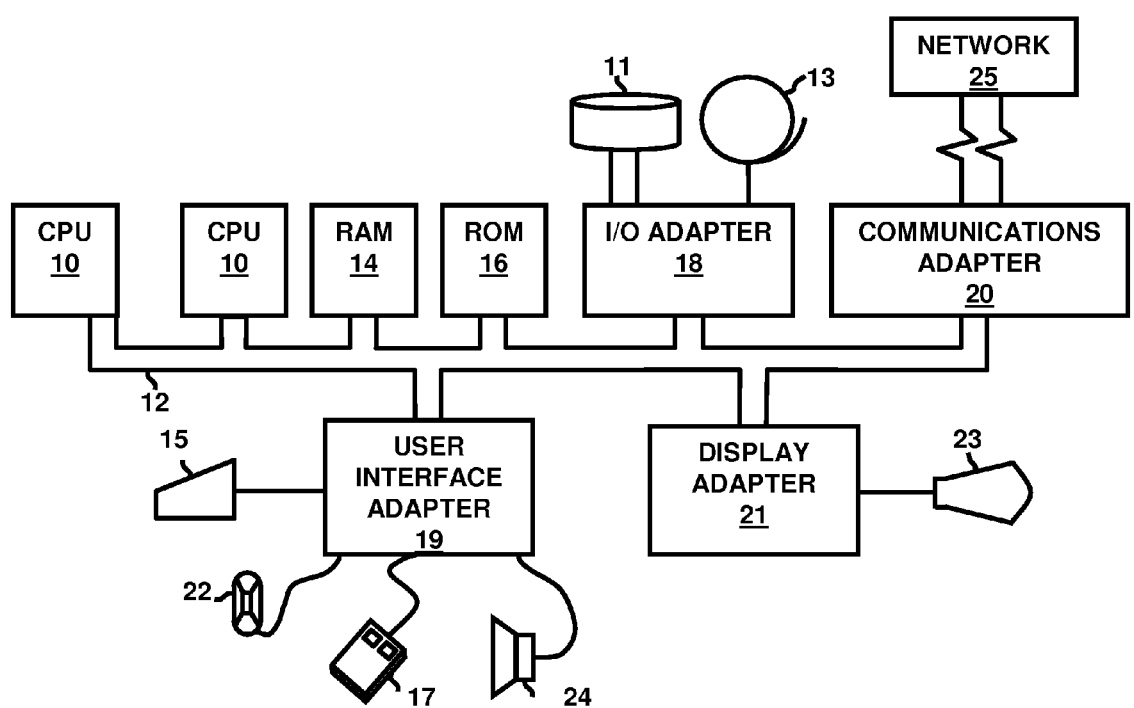
FIG. 3 is a schematic diagram of a system embodiment of the invention.

An exemplary communication system is shown in FIGS. 2 and 3. This system includes a sender 200, a recipient 202, and a computerized communications network of nodes 204-214 between the sender 200 and recipient 202. The "failed communication transmission" that is detected in item 100 is one that fails to reach the recipient 202 after attempting to be transmitted from the sender 200 to the recipient 202 over a specific communication path, such as nodes 204, 206, 211, and 214.

In order to initiate such testing (the first inquiry process 102 and the second inquiry process 104) the method sends instructions to the sender 200 and the recipient 202 over a second communication path (e.g., 204, 205, 210, and 213) that is different than the first communication path (204, 206, 211, and 214). One ordinarily skilled in the art would understand that these paths are only examples and any path could be the primary path and the secondary path.

A monitor 230 can be positioned in the sender 200 or the recipient 202 (or positioned external to both) and is operatively connected to the communication path. As shown in FIG. 2, there can be multiple monitors 230, or there can be just a single monitor 230. In addition, the sender 200 can include a first tester 232 and the recipient 202 can include a second tester 234.

The first tester 232 is operatively connected to the monitor 230 and is in communication with or positioned within the sender 200. Similarly, the second tester 234 is operatively connected to the monitor 230 and is in communication with or positioned within the recipient 202.

The monitor 230 detects the failed communication transmission that fails to reach the recipient 202 after attempting to be transmitted from the sender 200 to the recipient 202 over the communication path. As mentioned above, the monitor 230 sends instructions to the first tester 232 and the second tester 234 over the second communication path (e.g., 204, 205, 210, and 213) that is different than the first communication path (e.g., 204, 206, 211, and 214) to initiate the first inquiry process 102 and the second inquiry process 104. The first inquiry process 102 and the second inquiry process 104 respectively use the first tester 232 and the second tester 234 to send the test messages from opposite ends of the first communication path.

Thus, the first tester 232 initiates the first inquiry process 102 from the sender 200 upon the detection of the failed communication from the monitor 230. Again, the first inquiry 102 process tests how far the first test communication transmission can travel from the sender 200 to the recipient 202 along the first communication path (e.g., 204, 206, 211, and 214). The second tester 234 initiates the second inquiry process from the recipient 202 upon the detection of the failed communication from the monitor 230. Again, the second inquiry process tests how far the second test communication transmission can travel from the recipient 202 to the sender 200 along the first communication path.

The system further includes a processor that is operatively connected to the first tester 232 and the second tester 234. For example, FIG. 3 illustrates an exemplary system that could be included within the sender 200, the recipient 202, the monitor 230, the third party 220, any of the nodes 204-214, etc. The system in FIG. 3 comprises a hardware configuration of an information handling/computer system in accordance with the embodiments of the invention.

The system shown in FIG. 3 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices (computer readable media) that are readable by the system. The processors 10 can read the inventive instructions on the program storage devices 11, 13 and follow these instructions to execute the methodology of the embodiments of the invention, such as those shown in FIG. 1.

The system shown in FIG. 3 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The process of using the results of the first and second inquiry processes in item 106 involves identifying at least one of the nodes 204-214 positioned between a first farthest limit and a second farthest limit. The first farthest limit is the farthest location along the first communication path from the sender 200 where the first test communication transmission traveled. The second farthest limit is the farthest location along the first communication path from the recipient 202 where the second test communication transmission traveled as the possibly faulty node. For example, if the first communication path were nodes 204, 206, 211, and 214, and if the first inquiry process 102 was only able to get a test communication to travel from the sender 200 to node 204, the first farthest limit would be node 204. Similarly, if the second inquiry process 104 was only able to get a test communication to travel from the recipient 202 to node 211, the second farthest limit would be node 211. This would identify node 206 (in path 204, 206, 211, and 214) as the possibly faulty node, because node 206 is between the first farthest limit 204 and the second farthest limit 211. Similarly, both could reach node 204, indicating that node 204 was the possibly faulty node.

In some embodiments the results of the first and second inquiry processes can be sent to a third party 220 that is different than the sender 200 and the recipient 202. This third party 220 would then perform the process of using the results to identify the possibly faulty node.

As mentioned above, the processor 10 can be within the first tester 232, the second tester 234, the third party 220, etc. The first and second testers 232, 234, respectively output the results of the first and second inquiry processes to the processor 10. Then, the processor 10 combines the results of the first and second inquiry processes to determine which of the nodes in the communication path are not successfully forwarding test communications so as to identify the one or more possibly faulty nodes. The processor 10 combines the results by identifying the node or nodes positioned between the first farthest limit along the communication path from the sender 200 where the first test communication transmission traveled and the second farthest limit along the communication path from the recipient 202 where the second test communication transmission traveled as the possibly faulty node. As mentioned above, if the first communication path were nodes 204, 206, 211, and 214, and if the first inquiry process 102 was only able to get a test communication to travel from the sender 200 to node 204, the first farthest limit would be node 204. Similarly, if the second inquiry process 104 was only able to get a test communication to travel from the recipient 202 to node 211, the second farthest limit would be node 211. This would identify node 206 (in path 204, 206, 211, and 214) as the possibly faulty node, because node 206 is between the first farthest limit 204 and the second farthest limit 211.

The processor 10 outputs the identification of the possibly faulty node to the sender 200 and the recipient 202. In some embodiments the processor 10 can output, simultaneous with the outputting of the identification of the possibly faulty node, an identification of the failed communication transmission to the sender 200 and the recipient 202.

The testers 232, 234 can use any systems that are appropriate for a given network. Such systems are well-known to those ordinarily skilled in the art and are not discussed in detail herein. For example, U.S. Patent Publication 2008/0049634 (the complete disclosure of which is incorporated herein by reference) uses Traceroute® to analyze real-time data transmissions across a network. Similarly, in U.S. Patent Publication 2007/0177524 (the complete disclosure of which is incorporated herein by reference) based on analysis of TCP path information and/or send/receive packet counts, loss of certain network connectivity can be inferred. Further, U.S. Patent Publication 2006/0203739 (the complete disclosure of which is incorporated herein by reference) mentions that tools users employ to investigate network problems include Ping®, Traceroute®, Pathchar®, and Tulip®, discussed below, and that such tools typically trace the paths taken by packets to a destination.

Ping® (Packet Internet Grouper) is a computer network tool used to test whether a particular host is reachable across an IP network and was written by Mike Muuss in December, 1983 and is currently available at ftp.arl.army.mil/pub/ping-.shar. Traceroute® was written by Van Jacobson in 1987 from a suggestion by Steve Deering, with suggestions or fixes from C. Philip Wood, Tim Seaver and Ken Adelman and is currently available at ftp://ftp.ee.lbl.gov/traceroute.tar.gz. Pathchar® is a tool written by Van Jacobson of LBL's Network Research Group and is available at ftp://ftp.ee.lbl.gov/pathchar. Tulip® is a Java™ application developed by the MAGGIE-NS team from the National University of Sciences and Technology (NUST) Institute of Information Technology (NIIT) and the Stanford Linear Accelerator Center (SLAC) Internet End-to-end Performance Monitoring (IEPM) project in Palo Alto, Calif., USA and information on Tulip® can be found at www.slac.stanford.edu/comp/net/wan-mon/tulip/.

One exemplary implementation of the embodiments herein could use Traceroute® according to the following pseudocode:

```
if (networkError(endpoint)) { // if a network error occurs when trying
to communicate with point 'endpoint'
    String[ ] traceResult = traceroute(endpoint); // call traceroute,
which will record hops between this starting point and 'endpoint'. Record
the results in array traceResult
    for (int i=0; i < traceResult.length; i++) { // for each item in our array
        System.err.println(traceResult[i]); // print it out
        if (traceResult[i].containsString("Failure")) { // if it is the first
        failure found then
            System.err.println("Error occurred at point "+i+": "
            +traceResult[i]) // print out the info break; // exit the loop
        }
    }
}
```

Thus, as shown above, with embodiments herein, both ends of the connection perform testing when the network problem is spotted. By examining this routing information for each end of the connections, the point of probable failure can be narrowed when the two route reports are compared side by side. In more complex embodiments, both affected sites can transmit their information to the third party, to allow an automated determination of the point of failure.

The user is thus notified as to where the failure occurs. Comparison with the same information gathered at point 'endpoint' can be automatic or manual. The above code could be modified to update a log file with this information, as well as the time and date of recording.

Therefore, embodiments herein search for failures from both the sender side and the recipient side. Further, embodiments herein identify possible failed nodes before reporting the communications failure so that both the failure and the possible source of the failure can be reported together.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A computer-implemented method for simultaneously reporting a failed communication and identifying a faulty node in a communication path to a sender and a recipient, said method comprising:

detecting, by a computer, a failed communication that fails to reach said recipient after attempting to be transmitted from said sender to said recipient over said communication path comprising a plurality of nodes;

issuing, by said computer, a first diagnostic call, using an Internet Protocol, from said sender upon detection of said failed communication, said first diagnostic call comprising testing how far a first test communication can travel from said sender to said recipient along said communication path;

issuing, by said computer, a second diagnostic call, using said Internet Protocol, from said recipient upon said detection of said failed communication, said second diagnostic call comprising testing how far a second test communication can travel from said recipient to said sender along said communication path;

using results of said first diagnostic call and said second diagnostic call to determine, by said computer, which of said nodes in said communication path are not forwarding said first and said second test communications to identify at least one faulty node before reporting said failed communication to said sender and said recipient; and simultaneously reporting, by said computer, said failed communication and an identification of said at least one faulty node to said sender and said recipient.

2. The method according to claim 1, further comprising sending instructions to said sender and said recipient by a third party over other communication paths to issue said first diagnostic call and said second diagnostic call.

3. The method according to claim 1, said using of said results comprising identifying one of said plurality of nodes positioned at a first farthest limit along said communication path from said sender to where said first test communication traveled as said at least one faulty node and identifying one of said plurality of nodes positioned at a second farthest limit along said communication path from said recipient to where said second test communication traveled as said at least one faulty node.

4. A computer-implemented method for simultaneously reporting a failed communication and identifying a faulty node in a communication path to a sender and a recipient, said method comprising:

detecting, by a computer, a failed communication that fails to reach said recipient after attempting to be transmitted from said sender to said recipient over said communication path comprising a plurality of nodes;

issuing, by said computer, a first diagnostic call, using an Internet Protocol, from said sender upon detection of said failed communication, said first diagnostic call comprising testing how far a first test communication can travel from said sender to said recipient along said communication path;

outputting, by said computer, results of said first diagnostic call to a third party, said third party being different than said sender and said recipient;

issuing, by said computer, a second diagnostic call, using said Internet Protocol, from said recipient upon said detection of said failed communication, said second diagnostic call comprising testing how far a second test communication can travel from said recipient to said sender along said communication path;

outputting, by said computer, results of said second diagnostic call to said third party;

using, by said third party, said results of said first diagnostic call and said results of said second diagnostic call to determine, by said computer, which of said nodes in said communication path are not forwarding said first and said second test communications to identify at least one faulty node before reporting said failed communication to said sender and said recipient; and simultaneously reporting, by said computer from said third party, said failed communication and an identification of said at least one faulty node to said sender and said recipient.

5. The method according to claim 4, further comprising sending instructions to said sender and said recipient by said third party over other communication paths to issue said first diagnostic call and said second diagnostic call.

6. The method according to claim 4, said using of said results comprising identifying one of said plurality of nodes positioned at a first farthest limit along said communication path from said sender to where said first test communication traveled as said at least one faulty node and identifying one of said plurality of nodes positioned at a second farthest limit along said communication path from said recipient to where said second test communication traveled as said at least one faulty node.

7. A computer system comprising:

a processor configured to:

detect a failed communication that fails to reach a recipient after attempting to be transmitted from a sender to said recipient over a communication path comprising a plurality of nodes;

issue a first diagnostic call, using an Internet Protocol, from said sender upon detection of said failed communication, said first diagnostic call comprising testing how far a first test communication can travel from said sender to said recipient along said communication path;

issue a second diagnostic call, using said Internet Protocol, from said recipient upon said detection of said failed communication, said second diagnostic call comprising testing how far a second test communication can travel from said recipient to said sender along said communication path; and use results of said first diagnostic call and said second diagnostic call to determine which of said nodes in said communication path are not forwarding said first and said second test communications to identify at least one faulty node before reporting said failed communication to said sender and said recipient, and simultaneously report said failed communication and an identification of said at least one faulty node to said sender and said recipient; and a memory that stores said results.

8. The computer system according to claim 7, wherein said processor is further configured to send instructions to said sender and said recipient by a third party over other communication paths to issue said first diagnostic call and said second diagnostic call.

9. The computer system according to claim 7, wherein said processor is further configured to use said results comprising identifying one of said plurality of nodes positioned at a first farthest limit along said communication path from said sender to where said first test communication traveled as said at least one faulty node and identifying one of said plurality of nodes positioned at a second farthest limit along said communication path from said recipient to where said second test communication traveled as said at least one faulty node.

10. A non-transitory computer program storage medium storing computer program instructions executable by a computer to perform a method for simultaneously reporting a failed communication and identifying a faulty node in a communication path to a sender and a recipient, said method comprising:

detecting a failed communication that fails to reach said recipient after attempting to be transmitted from said sender to said recipient over a communication path comprising a plurality of nodes;

issuing a first diagnostic call, using an Internet Protocol, from said sender upon detection of said failed communication, said first diagnostic call comprising testing how far a first test communication can travel from said sender to said recipient along said communication path;

issuing a second diagnostic call, using said Internet Protocol, from said recipient upon said detection of said failed communication, said second diagnostic call comprising testing how far a second test communication can travel from said recipient to said sender along said communication path;

using results of said first diagnostic call and said second diagnostic call to determine which of said nodes in said communication path are not forwarding said first and said second test communications to identify at least one faulty node before reporting said failed communication to said sender and said recipient; and simultaneously reporting said failed communication and an identification of said at least one faulty node to said sender and said recipient.

11. The method stored on said non-transitory computer storage medium according to claim 10, further comprising sending instructions to said sender and said recipient by a third party over other communication paths to issue said first diagnostic call and said second diagnostic call.

12. The method stored on said non-transitory computer storage medium according to claim 10, said using of said results comprising identifying one of said plurality of nodes positioned at a first farthest limit along said communication path from said sender to where said first test communication traveled as said at least one faulty node and identifying one of said plurality of nodes positioned at a second farthest limit along said communication path from said recipient to where said second test communication traveled as said at least one faulty node.

13. The method according to claim 1, wherein said testing how far a first test communication can travel from said sender to said recipient along said communication path is determined only by interactions of said first diagnostic call with nodes of said communication path, and wherein said testing how far a second test communication can travel from said recipient to said sender along said communication path is determined only by interactions of said second diagnostic call with nodes of said communication path.

14. The method according to claim 4, wherein said testing how far a first test communication can travel from said sender to said recipient along said communication path is determined only by interactions of said first diagnostic call with nodes of said communication path, and wherein said testing how far a second test communication can travel from said recipient to said sender along said communication path is determined only by interactions of said second diagnostic call with nodes of said communication path.

15. The computer system according to claim 7,
wherein said testing how far a first test communication can travel from said sender to said recipient along said communication path is determined only by interactions of said first diagnostic call with nodes of said communication path, and
wherein said testing how far a second test communication can travel from said recipient to said sender along said communication path is determined only by interactions of said second diagnostic call with nodes of said communication path.

16. The method stored on said non-transitory computer storage medium according to claim 10,
wherein said testing how far a first test communication can travel from said sender to said recipient along said communication path is determined only by interactions of said first diagnostic call with nodes of said communication path, and
wherein said testing how far a second test communication can travel from said recipient to said sender along said communication path is determined only by interactions of said second diagnostic call with nodes of said communication path.

* * * * *